May 2, 1933.  C. W. DAVIS ET AL  1,906,315
PROCESS OF AND MACHINE FOR WORKING GLASS
Filed Oct. 29, 1928  4 Sheets-Sheet 1
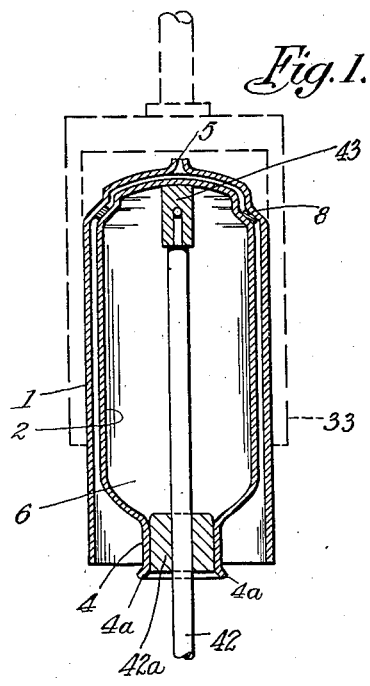
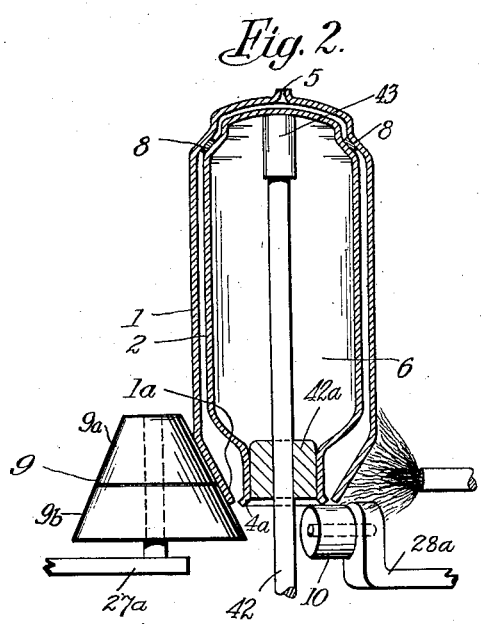
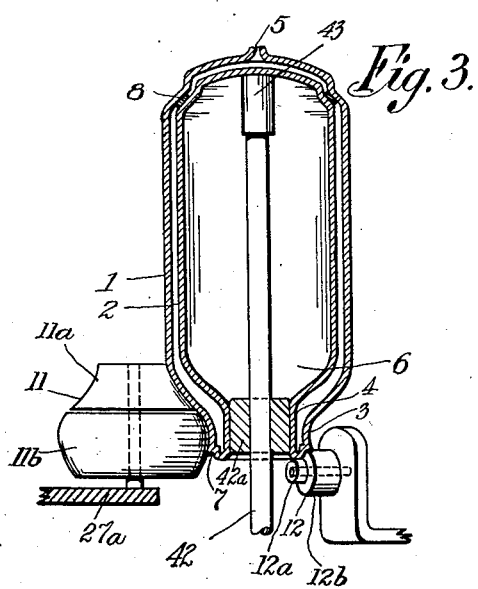
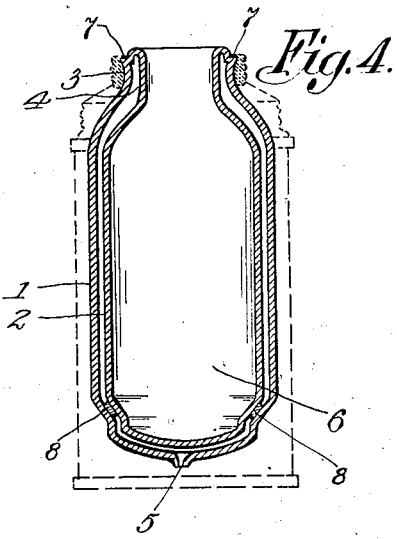
INVENTORS
Cortland W. Davis and
Fred F. Becker
BY Thomas G. Stewart,
ATTORNEY.

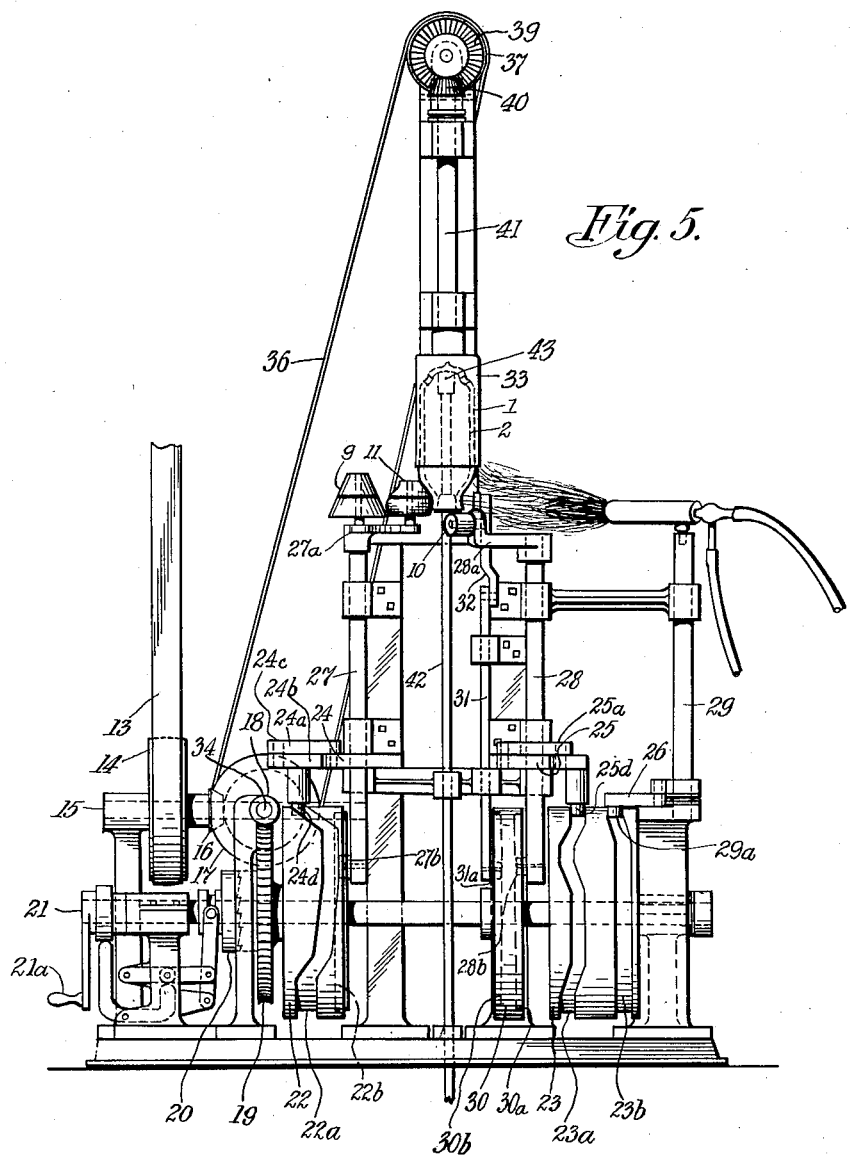

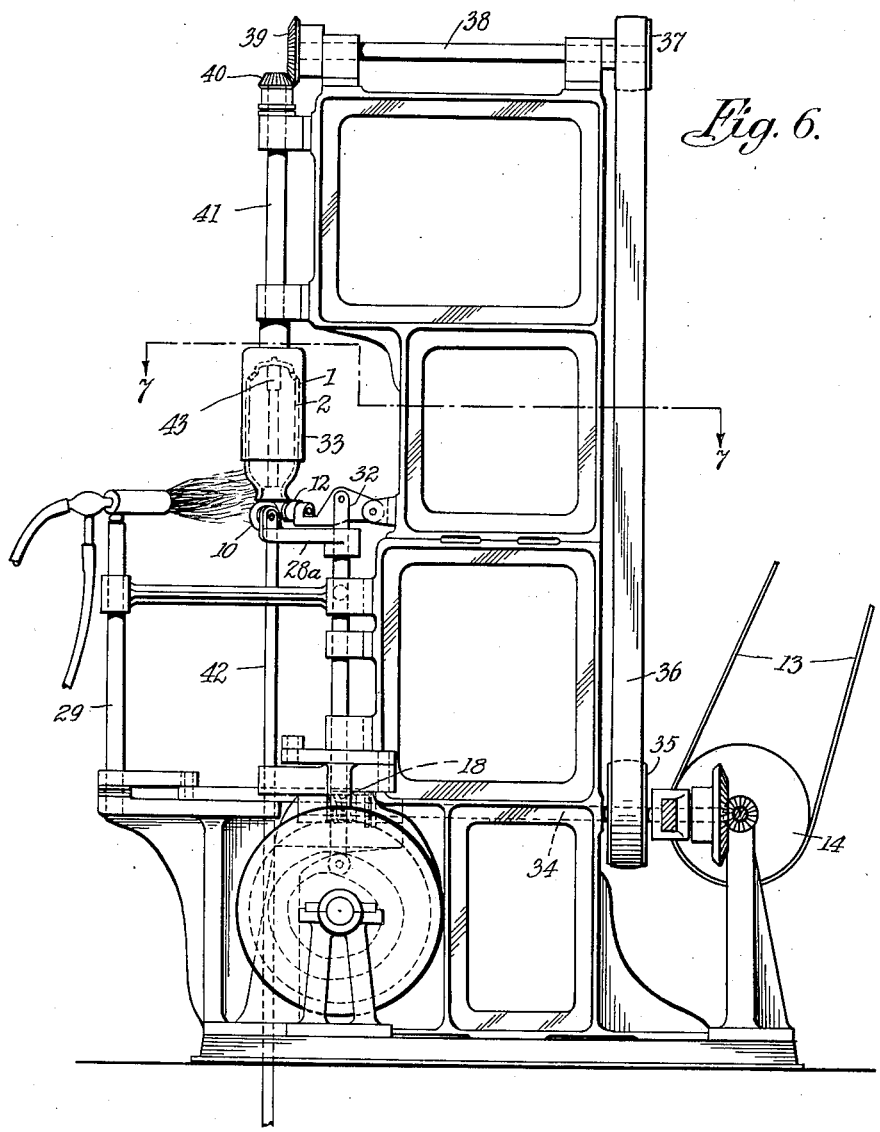

May 2, 1933.   C. W. DAVIS ET AL   1,906,315
PROCESS OF AND MACHINE FOR WORKING GLASS
Filed Oct. 29, 1928   4 Sheets-Sheet 4

INVENTORS
Cortland W. Davis and
Fred F. Becker,
BY
Thomas G. Steward,
ATTORNEY.

Patented May 2, 1933

1,906,315

UNITED STATES PATENT OFFICE

CORTLAND W. DAVIS, OF OAK PARK, AND FRED F. BECKER, OF CHICAGO, ILLINOIS, ASSIGNORS TO THE MANTLE LAMP COMPANY OF AMERICA, OF CHICAGO, ILLINOIS, A CORPORATION OF ILLINOIS

PROCESS OF AND MACHINE FOR WORKING GLASS

Application filed October 29, 1928. Serial No. 315,880.

The invention, in general, relates to a method and apparatus for working glass, although it is particularly useful in the making of vacuum-insulated glass receptacles, objects thereof being to facilitate the assembling and the union of the parts of such receptacles and to produce completed products of any desired size and shape and possessing unusual strength and durability. Incidentally, the invention involves a machine that will enable unskilled workmen to execute the process. The process, however, may be performed by skilled glass workers without the aid of a machine other than one which is adapted to adequately heat and rapidly rotate the assembled blanks.

The new process, whether performed by a machine or by skillful hand manipulation, involves, heating and softening an end of the outer of concentrically arranged and spaced glass blanks, rotating said blanks, and pressing a suitable tool against the outside of said end, thereby spinning and reducing its diameter and producing a neck that may be joined to the upper end of the inner blank which may terminate in a small outwardly-extending rib or lip.

A machine suitable for this purpose includes means for concentrically holding an outer and an inner blank; means for synchronously rotating the two blanks while in concentric relations; means for heating proximate ends of the glass blanks, to render the same pliable, so that the extremity of the outer blank may, by some suitable means, be desirably contracted and subsequently fused and united to the inner blank.

A tool which is especially useful in the performance of the new process, is provided with a roller which, as the concentrically disposed blanks revolve, incrementally contracts the softened end of the outer blank until a desired neck is produced at that end of the said blank.

In the manufacture of any vacuum-insulated glass receptacle, it is necessary that the outer blank have an open end through which the inner blank of the receptacle may be inserted. To complete the receptacle it is necessary to unite the two blanks and to seal the space between them, so that a vacuum may be created therein. Usually, it is the lower end of the outer blank that is left open for the introduction of the inner blank, the pre-formed neck of the outer blank being too small to permit the inner blank to be passed through it, and it is this lower end that has to be closed in order to seal the space between the walls of the completed product. The closure of that end of the outer blank is effected by the heating and the drawing in of the glass thereat, until the opening disappears at the axial center of said blank. The attenuation of the glass, resulting from this operation, seriously weakens the product even if it be small, and impairs the strength of larger products to a much greater extent.

Attenuation of the glass in any part of a vacuum-insulated receptacle is, likewise, disadvantageous, and this defect is entirely overcome by the present invention which not only provides for maintaining the thickness of all parts of the blanks from which such a receptacle is made, but even for a thickening of parts which, hitherto, have been attenuated and weakened during the process of manufacture.

Furthermore, the present invention does not eliminate any part of the glass of the outer blank, the length of the manipulated portion of the outer blank being such as that when contracted it will supply enough glass to avoid undue thinning of the contracted portion.

Also, the spinning operation which distinguishes that invention from previous inventions, regardless of whether it is acting to merely contract a part of the outer blank, or to unite the two blanks, or to reshape the neck of the outer blank, is such as to yield a product that is devoid of irregularities in and is of uniform thickness throughout the entire circumference of its neck. This glass spinning operation is similar to that kind of sheet metal spinning wherein the tool is so applied to the work that the metal is "held" to at least its original thickness, and may, in fact, be thickened, and the spinning of the glass may be so done that the glass at the neck will be of equal or even greater thickness than the glass from which said neck is made. It will thus be seen that the process admits of the production of vacuum-insulated glass receptacles of large size, as the size is unrestricted by the inherent weakness of the devices of the prior art.

The process should be practised with the blanks inverted, since, in that event, gravitative force will be exerted in the direction of and be resisted by the shaping tools which would not be the result if the blanks were rotated while in an upright or a horizontal position.

Collapse of the neck of the outer blank by the pressure of the tool during the spinning operation is prevented by the centrifugal force developed during the rotation of the blanks, the speed of rotation being such as will produce this result.

The invention will be the best understood if reference be had to the detailed description hereinafter included and to the accompanying drawings appended hereto, in which:

Figure 1 is a sectional view of the assembled blanks, with their supporting means;

Figure 2 is a sectional view of the two blanks, showing a burner and the rollers which respectively spin the free edge of the outer blank and unite the outer blank and the neck of the inner blank;

Figure 3 is a sectional view showing the shaping rollers employed in giving the neck of the product the final configuration;

Figure 4 is a sectional view of the completed product showing in dotted line a protective casing therefor;

Figure 5 is a view in front elevation, of a machine which is capable of automatically performing the process herein described;

Figure 6 is a view of said machine in side elevation;

Figure 7:
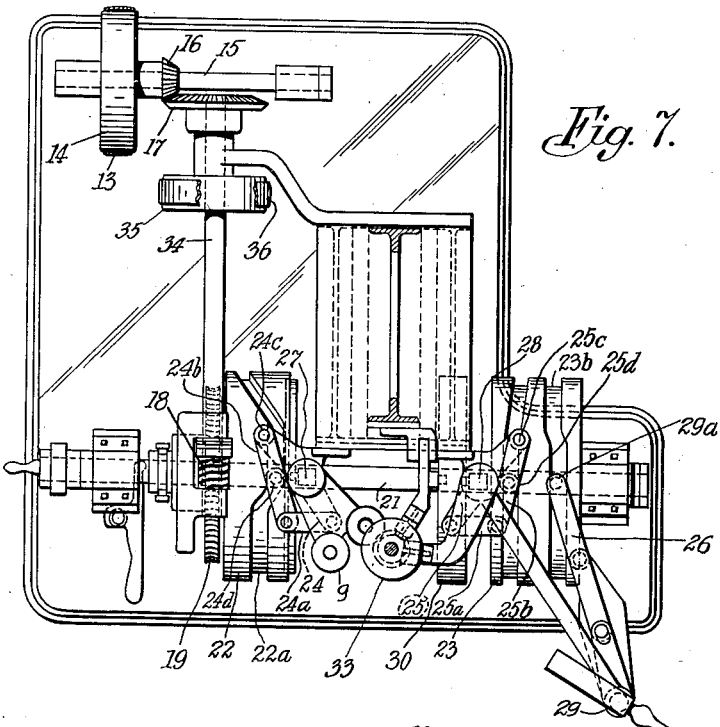
Figure 7 is a plan view of the parts of said machine below the line 7—7 indicated in Figure 6.

This machine includes rollers of different shapes for successively performing the steps of the process whereby the blanks are united and the product is given its desired shape. This product, when thus completed, consists of two concentric blanks 1 and 2 closed at their bottoms and united at their necks, 3 and 4. The bottom of the outer blank 4 has an exhaust opening 5, through which the air between the two blanks may be exhausted and a vacuum created therein, and the space 6 within the inner blank constitutes a receptacle for food or liquid products. A preferred form of the device includes an annular external seat 7 formed at the top of the outer blank in which the inturned edge of a protective jacket may rest. Spacers 8 of material, such as asbestos, maintain the concentricity of the blanks until they are firmly united at their necks, and also prevent undue vibrations of the inner blank after the union of the two blanks has been effected. Said spacers also cause the inner blank to synchronously turn with the outer blank during the performance of the process.

The outer blank 1 is, initially, of cylindrical shape, while the inner blank is provided with a neck 4, preferably terminating in a very slight flange 4a that is welded to that portion of the outer blank which, by subsequent manipulation, is fashioned into a neck 3, of desired contour.

The machine includes four rollers, 9, 10, 11 and 12, the roller 9 being of truncated conical form to thereby incrementally spin or turn inward the free edge 1a of the outer blank sufficiently to admit of the union of said edge with the neck of the inner blank, and the roller 10 being cylindrical in shape and adapted to facilitate the joining of the proximate masses of glass. The parts 9a, 9b of the roller 9 are, respectively, made of metal and carbon, metal being employed because of the considerable resistance offered during the initial stages of the spinning and carbon being used because it will not adhere to the glass.

The rollers 11 and 12 are shaping rollers. The roller 11 consists of an upper part 11a, and the lower part 11b. These, and the parts of the roller 9 are capable of rotating independently, so that each may have the same peripheral speed as the part of the outer blank with which it is in contact. The shaping roller 12 has two cylindrical parts 12a, 12b, which, for a like reason, may independently rotate, this roller being the means for forming the seat, 7. The contour of these shaping rollers 11, 12, may be varied to produce a neck of any desired shape.

Figure 8:
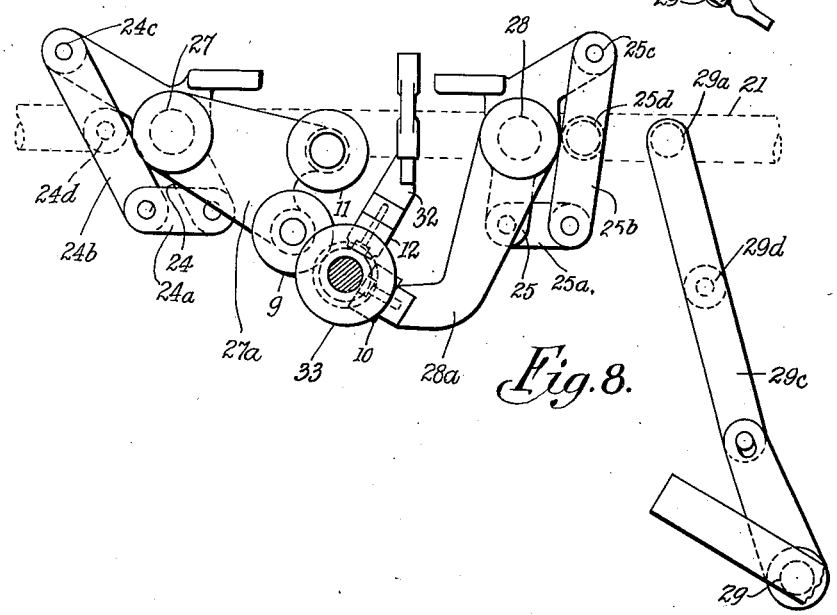
Figure 8 is a plan view of certain trains of mechanism constituting parts of said machine.

Any suitable trains of elements for operating the aforesaid rollers in timed relations, may be employed. One arrangement of such elements is embodied in the machine illustrated in Figures 5, 6, 7, and 8 wherein is shown a driving belt 13 passing around a pulley 14, transmitting motion through a shaft 15 to pinion 16, a gear 17, a shaft 34, a worm 18, a worm gear 19 and a clutch 20 to a shaft 21 carrying cams 22 and 23 which have grooves 22a and 23a and 23b, respectively co-operating through suitable means with arms 24, 25 and 26, fixed to and operating to partly rotate shafts 27, 28 and 29, at the proper times. The shaft 21 has a handle 21a by means of which it may be actuated by hand.

The end of the arm 24 is pivoted to one end of a link 24a, the other end of this link being pivoted to a lever 24b pivoted at 24c and carrying a roller 24d extending into the groove 22a of the cam 22, a similar train of elements, 25, 25a, 25b, 25c, 25d, being employed to actuate the shaft 28.

The shaft 29 is actuated by a train of elements consisting of a roller 29a extending into the groove 23b of the cam 23, and a lever 29c, carrying said roller and pivoted at 29d, one end of this lever being pivoted to the arm 26 of said shaft 29.

The terminal arms 27a and 28a of the shafts 27, 28, respectively carry the aforesaid rollers 9, 10 which successively perform the operations indicated in Figure 2. The arm 27a also carries the shaping roller 11 which imparts to the neck 3 the desired shape.

The cam 22 has a face groove 22b in which runs a roller 27b attached to the lower end of the shaft 27. The function of this construction is to enable the roller 9 to be raised to thereby give to the blank the shape indicated in Figure 2, the arm 24 being splined to the shaft 27 so as to permit said shaft to be moved vertically.

The arm 25 is similarly splined to the shaft 28 so that said shaft may have a vertical as well as a rotary movement to thereby permit the roller 10 to be moved upward against the work. In order to effectuate this movement the lower end of the shaft 28 is provided with a roller 28b actuated by a cam 30 having on a face thereof a cam groove 30a, said cam 30 being carried by the shaft 21.

Said cam 30 has also a cam groove 30b, actuating the roller 12 which produces the seat 7 heretofore mentioned, a rod 31 carrying a roller 31a engaging said cam groove and a pivoted arm 32, being the intervening elements.

The shaft 29 carries the burner that produces the flame for heating the glass at those parts of the blanks which are operated upon by the rollers 9, 10, 11 and 12, and this shaft is at predetermined intervals automatically rotated to cause the flame to approach and heat and soften the glass.

Rotation of the blanks is effectuated by a suitable chuck 33, this chuck being driven from a shaft 34, on which the worm 18 is mounted, the elements of the intervening train of mechanism being the pulley 35, the belt 36, the pulley 37, the shaft 38, the beveled pinions 39, 40 and the shaft 41 which carries the chuck 33.

The inner blank is initially supported in the outer blank, by an adjustable rod 42 having at its upper end a rotary cap 43 which may easily turn with the inner blank. This rod carries a spacer 42a which centers and gives shape to the neck 4.

The machine is so geared that the chuck has a high speed of rotation, while other parts move at relatively low speeds, the object of rotating the chuck at high speed being to hold the softened glass against the roller 9 by centrifugal force, which, although it constantly resists the pressure of that roller, does not interfere with the diametrical reduction of the part 1a of the outer blank from which the neck 3 is formed.

In performing the new process, herein described, the inner blank is inserted in the outer blank and held in concentric relation therewith by pieces of asbestos, or other suitable substance, which are so disposed that, as shown, they will prevent longitudinal as well as lateral relative movements of the two blanks. These blanks are then synchronously rotated at a speed sufficient to establish the desired centrifugal force at the free edge of the outer blank. Said free edge is then softened by heat, and spun until it assumes approximately the shape shown in Figure 2, the spinning being performed by any suitable tool, as, for instance, the conical roller 9 which gradually forces the softened glass inward.

This spinning is incremental, only a very small inward displacement of the softened glass being produced during a single revolution of the blanks. If the process were so conducted as to manipulate an excessive mass of the glass during a single revolution of the blanks, the inward displacement of said mass would lack circumferential uniformity both as regards thickness and configuration. Celerity in the operation is, however, attained by the rapid rotation of the blanks.

The use of a roller, such as the conical roller 9, greatly facilitates the spinning and renders it automatic. This roller is slowly raised during the spinning operation, and, although it does not move inward towards the work, it wider parts then operate in a wedge-like manner to produce an inward and incremental displacement geometrically conforming to a spiral having a gradually decreasing radius.

When the inward displacement of the softened glass at the mouth of the outer blank has brought the edge 1a into close relation to the edge of the neck of the inner blank, a suitable tool, such as the cylindrical roller 10, is pressed against said edges, rotation of the blanks being continued until said edges are welded together and the space between the two blanks is hermetically sealed. If the cylindrical roller 10 instead of a hand tool is employed, the gradual raising of that tool by its timed actuating devices renders the welding operation automatic.

The union of the two blanks having thus been effected, a useful product is in being, although it is preferred to subject it to further operations in order to give its neck any desired shape, as, for instance, the shape shown in Figures 3 and 4. These further operations may be conducted while the flame of the burner is still playing upon the glass at the necks of the united blanks.

These shaping operations may be performed by hand, although it is more advantageous to use a machine which will automatically do the work.

The rollers 11 and 12 are well adapted for this purpose, and these rollers may be made to operate either sequentially or simultaneously, their timed movements being determined by the curves of the cam grooves which govern the movements of their actuating trains of mechanism.

The roller 11 moves laterally while the roller 12 moves vertically, the outer configuration of the neck of the product being a replica of the contour of said roller 11, and the seat 7 of said neck being a replica of the contour of said roller 12.

The rollers 9 and 11, being carried by the same shaft 27, are simultaneously raised, the roller 9 meantime operating to spin the softened glass of the part 1a of the outer blank. After the roller 9 has sufficiently spun and contracted said part 1a, the shaft 27, turns without being further raised, to thereby cause the roller 11 to move in the arc of a circle intercepting the still softened glass and to give it the desired external configuration. This configuration may be such, as shown in Figures 3 and 4, that the neck of the finished product has a slight upward flare whereby it may be supported by a circumscribing element, as shown by the dotted lines of Figure 4, and thereby provide a space in which a seal may be used to interlock the bottle neck and a protecting jacket.

The new process, herein disclosed, is distinguishable from other processes heretofore employed in the manufacture of vacuum-insulated receptacles, in that the neck of the inner wall is initially and finally of substantially cylindrical form, and the neck of the outer wall is initially an extension of the body of said wall which, by manipulation, is so contracted as to admit of its union with the neck of the inner blank. The finished product is also distinguishable from other vacuum-insulated receptacles, not only because it contains a manipulated outer neck portion, but because the glass of said neck and of the weld between the necks is at least as thick as that of the body of the outer blank. Furthermore, since the outer blank does not, as in other processes, have to be left open at its lower end for introduction of the inner blank, and subsequently heated and contracted and closed (an operation which materially thins the glass thereat), said blank will have a closed bottom of substantially the same thickness as that of its body portion. Hence, any glass vacuum-insulated receptacle wherein the bottom is not unduly thinned may be readily identified as a product of a process which involves the production of blanks of different sizes and having closed bottoms, introducing the smaller into the larger of said blanks, forming a neck on said outer blank, and, finally, uniting said neck and an adjacent portion of the inner blank which, as will be understood, is the neck with which that blank is initially provided. The production of the neck of this outer blank is facilitated by the fact that the glass of the outer blank need be contracted only sufficiently to meet the circular contour of the neck of the inner blank, whereas the closing of the lower end of an outer cylindrical blank requires inward drawing to a single point, and produces attenuation of the glass.

The blanks may be blown and their bodies given any desired shape, the neck of the inner blank initially requiring no alteration except at the upper edge, and retaining its original thickness when the receptacle is completed.

The term "manipulated" as employed herein has reference to work done on the softened glass of a blank after said blank has been made, whether that work is performed by a hand tool or by a tool which is part of an organized machine.

As will also be observed, the manufacture of the vacuum-insulated glass receptacles is simplified by the new process herein set forth, since the closing of the vacuum space is effected at one end instead of at both ends of the product.

Having thus described our invention, what we claim is:

1. A process of contracting one end of a cylindrical glass blank, characterized by heating the glass at one end thereof to render it workable and obliquely applying pressure to the workable glass, beginning at the original free edge thereof, to thereby produce a neck which contains all of the displaced workable glass.

2. A process of contracting one end of a cylindrical glass blank, characterized by heating the glass at one end thereof to render it workable, rotating said blank on its longitudinal axis, and obliquely applying pressure to the workable glass, beginning at the original free edge thereof, to thereby produce a neck which contains all of the displaced workable glass.

3. A process of contracting one end of a cylindrical glass blank, characterized by heating the glass at one end thereof to render it workable, rotating said blank on its longitudinal axis at a speed sufficient to develop enough centrifugal force to prevent collapse of the workable glass, and obliquely applying pressure to the workable glass, beginning at the original free edge thereof, to thereby produce a neck which contains all of the displaced workable glass.

4. A process of making a composite glass article comprising an outer hollow member that is provided with a neck and a closed bottom and an inner member having a body portion which is too large to be inserted through said neck, characterized by the insertion of an inner blank having a preformed neck within a large cylindrical outer blank having an open end and a closed bottom, heating the glass at the open end of said outer blank to render it workable, obliquely applying pressure to the workable glass, beginning at the original free edge thereof, to thereby produce a neck which contains all of the displaced workable glass, and welding said neck to the proximate end of the inner blank.

5. The process of producing a vacuum-insulated glass receptacle, characterized by the assemblying, one within the other, of two blanks, each having a closed bottom, heating the glass at the free end of the outer blank to render it workable, obliquely applying pressure to the workable glass, beginning at the original free edge thereof, to thereby produce a neck which contains all of the displaced workable glass, and welding said neck to the proximate end of the inner blank.

6. The process of making a glass article from an inner member and a hollow outer blank having an open end and a closed end, and wherein all of the workable glass in the outer blank is used, characterized in that the inner member is inserted within the hollow blank; that the open end of the outer blank is heated and rendered workable; and that said workable end is circumferentially and incrementally contracted by external pressure and is simultaneously lengthened in such a manner that the tendency of the glass to become attenuated by lengthening is counteracted by its tendency to become thickened by its circumferential contraction.

7. A machine for producing a vacuum-insulated glass receptacle having an outer and an inner wall, including means for concentrically sustaining two cylindrical hollow blanks having closed bottoms, one within the other, means for heating the glass at the free end of the outer blank to render it workable, means for obliquely applying pressure to the workable glass, beginning at the free edge thereof, to thereby produce a neck which contains all of the displaced workable glass, and means for welding said neck to the proximate end of the inner blank.

8. A machine for contracting the diameter of the free end of a cylindrical glass blank, characterized by the inclusion of means for rotating such a blank, means for heating a free end thereof, and obliquely-acting means for contracting said free end to thereby form a neck containing all of the displaced glass.

9. A machine for contracting the diameter of a free end of a cylindrical glass blank, characterized by the inclusion of means for rotating such a blank, means for heating a free end thereof, and an obliquely-acting roller for contracting said free end to thereby form a neck containing all of the displaced glass.

10. A machine for contracting the diameter of the free end of a cylindrical glass blank, characterized by the inclusion of means for rotating such a blank, means for heating a free end thereof, and an obliquely-acting conical roller for contracting said free end to thereby form a neck containing all of the displaced glass.

11. A machine for producing a glass vacuum-insulated receptacle having an outer and an inner wall, characterized by the inclusion of means for heating an end of an outer blank to render it workable, obliquely-acting means for producing a neck on said blank containing all of the displaced glass, and means for welding said neck to the proximate part of the inner wall of said receptacle.

12. A machine for producing a glass vacuum-insulated receptacle having an outer and an inner wall, characterized by the inclusion of means for heating an end of an outer blank to render it workable, an obliquely-acting roller for producing a neck on said blank containing all of the displaced glass, and another roller for welding said neck to the proximate part of the inner wall of said receptacle.

13. A machine for producing a glass vacuum-insulated receptacle having an outer and an inner wall, characterized by the inclusion of means for heating an end of an outer blank to render it workable, an obliquely-acting roller for producing a neck on said blank containing all of the displaced glass, another roller for welding said neck to the proximate part of the inner wall of said receptacle, and a shaping roller for giving the neck a desired contour.

14. A machine for producing a glass vacuum-insulated receptacle having an outer and an inner wall, characterized by the inclusion of means for heating an end of an outer blank to render it workable, an obliquely-acting roller for producing a neck on said blank containing all of the displaced gas, another roller for welding said neck to the proximate part of the inner wall of said receptacle, a shaping roller for giving the neck a desired contour, and a further shaping roller for producing a seat on said neck.

15. A machine for uniting hollow glass blanks including a spring-pressed rod adapted to move into the inner of said blanks to thereby sustain both blanks, a chuck for imparting synchronous rotary motions to said blanks, fires for heating proximate edges of said blanks, and means for contracting the edge of said outer blank while heated to thereby force said edge into contact with said inner blank.

16. A machine for uniting hollow glass blanks and including means for synchronously rotating said blanks while arranged one within the other with edges thereof in proximity, means for heating said edges, a rod adapted to move into the inner of said blanks to thereby sustain both blanks, means carried by said rod for sustaining and shaping the edge of the inner blank, additional means for forcing one of said edges into contact with the other of said blanks to thereby unite said blanks without waste of material, and means proximate the edge of said inner blank for further shaping said edge.

17. A machine for uniting the inner and the outer glass blank of a vacuum bottle wherein the inner blank has a preformed neck, including means for supporting said blanks one within the other, means for heating the edges of said blanks, and means for sustaining the heated edge of said outer blank and, at the same time, contracting said edge until its circumference approximates that of the edge of the inner blank.

18. The process of manipulating the free edge of a cylindrical glass blank, which consists in heating said edge to render it workable, and then subjecting it to the action of forces which prevent its elongation and, at the same time, reduce its diameter, whereby a neck is produced without undue thinning of the manipulated portion of the glass.

19. The process of shaping a hollow glass blank, which consists in rotating said blank, heating and rendering workable a free end of said blank, and shaping said free end to form a contracted neck while sustaining all of the workable glass therein.

20. A machine for shaping a hollow glass blank, including means for sustaining and rotating such a blank, means for heating a free end of said blank to render it workable, a roller having an obliquely-disposed surface for sustaining and shaping said free end, and means for raising said roller.

In testimony whereof we affix our signatures.

CORTLAND W. DAVIS.
FRED F. BECKER.